(12) United States Patent
Kato

(10) Patent No.: US 11,221,688 B2
(45) Date of Patent: Jan. 11, 2022

(54) INPUT APPARATUS WITH RELATION BETWEEN PEN AND FINGER TOUCHES

(71) Applicant: Wacom Co., Ltd., Saitama (JP)

(72) Inventor: So Kato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/994,178

(22) Filed: Aug. 14, 2020

(65) Prior Publication Data

US 2021/0055808 A1 Feb. 25, 2021

(30) Foreign Application Priority Data

Aug. 22, 2019 (JP) .............................. JP2019-151645

(51) Int. Cl.
  *G06F 3/03* (2006.01)
  *G06F 3/0354* (2013.01)
  *G06F 3/041* (2006.01)
  *G06F 3/044* (2006.01)
  *G06F 3/046* (2006.01)

(52) U.S. Cl.
  CPC .......... *G06F 3/03545* (2013.01); *G06F 3/046* (2013.01); *G06F 3/0416* (2013.01); *G06F 3/0442* (2019.05); *G06F 3/04162* (2019.05); *G06F 3/0445* (2019.05)

(58) Field of Classification Search
  CPC .... G06F 3/03545; G06F 3/041; G06F 3/0416; G06F 3/04162; G06F 3/044; G06F 3/0442; G06F 3/0445; G06F 3/046
  See application file for complete search history.

(56) References Cited

U.S. PATENT DOCUMENTS

| | | | | |
|---|---|---|---|---|
| 2014/0152594 | A1* | 6/2014 | Kim | G06F 3/04166 345/173 |
| 2014/0218343 | A1* | 8/2014 | Hicks | G06F 3/03545 345/179 |
| 2015/0049031 | A1 | 2/2015 | Maruoka et al. | |
| 2016/0077663 | A1* | 3/2016 | Durojaiye | G06F 3/04186 345/173 |
| 2017/0177145 | A1* | 6/2017 | Hara | G06F 3/04162 |
| 2018/0373392 | A1* | 12/2018 | Murakami | G06F 3/017 |

FOREIGN PATENT DOCUMENTS

| | | |
|---|---|---|
| JP | 2012-221358 A | 11/2012 |
| JP | 2015-38718 A | 2/2015 |

* cited by examiner

*Primary Examiner* — Liliana Cerullo
(74) *Attorney, Agent, or Firm* — Seep IP Law Group LLP

(57) ABSTRACT

An input apparatus includes a pen indicating position detector that detects a pen position indicated by an electronic pen held by a user on an input surface, a touch position detector that detects a touch position touched by the user on the input surface, a processor, and a memory storing instructions that, when executed by the processor, cause the processor to: receive information about the pen position detected by the pen position detector and information about the touch position detected by the touch position detector, and perform a process based on at least one of the information about the pen position and the information about the touch position.

13 Claims, 8 Drawing Sheets

INPUT APPARATUS WITH RELATION BETWEEN PEN AND FINGER TOUCHES

BACKGROUND

Technical Field

The present disclosure relates to an input apparatus having a touch position detection function for detecting a touch position touched by, for example, a finger of a user and a pen indicating position detection function for detecting a pen indicating position indicated and input by an electronic pen held by the user.

Background Art

A widely known input apparatus allows a user to perform a writing or drawing input with an electronic pen. Another known input apparatus of this type can detect not only a pen indicating position indicated and input by an electronic pen but also a touch position touched by the user (e.g., Japanese Patent Laid-open No. 2015-38718; hereinafter, Patent Document 1). Conventionally, an input apparatus of this type can switch between pen types (e.g., a ballpoint pen or a brush) and writing colors. Moreover, such an input apparatus can also switch between process function modes with respect to an input of a pen indicating position from an electronic pen. For example, an input apparatus disclosed in Patent Document 1 has a writing mode and an eraser mode that can be switched by the user. In the writing mode, the input apparatus accepts an input of a pen indicating position from an electronic pen as a new writing input. In the eraser mode, the input apparatus accepts the input of the pen indicating position from the electronic pen as a deletion input for deleting a writing input that has been made in the past.

The conventional input apparatus performs the above-described switching in response to the user clicking an icon displayed on a display screen or pressing an operation button physically provided on the input apparatus. For example, when the user clicks an eraser icon with the electronic pen or a finger while the input apparatus is in the writing mode, the input apparatus switches from the writing mode to the eraser mode.

Such a conventional input apparatus requires the user to click an icon or press an operation button to switch between process functions. The inability to swiftly switch between the process functions can result in reduced operation efficiency.

SUMMARY

It is desirable to provide an input apparatus that can solve or alleviate the above-described problem.

In order to solve or alleviate the above-described problem, there is provided an input apparatus including a pen position detector which, in operation, detects a pen position indicated by an electronic pen held by a user on an input surface, a touch position detector which, in operation, detects a touch position touched by the user on the input surface, and a processor, and
a memory storing instructions that, when executed by the processor, cause the processor to: receive information about the pen position detected by the pen position detector and information about the touch position detected by the touch position detector, and perform a process based on at least one of the information about the pen position and the information about the touch position. When the processor receives the information about the pen position and the information about the touch position within a predetermined period of time, the processor determines whether a positional relation between the pen position and the touch position is a special positional relation. When the processor determines that the positional relation between the pen position and the touch position is the special positional relation, the processor performs a predetermined process associated with the special positional relation between the pen indicating position and the touch position.

In the input apparatus configured as above, the processor determines whether the positional relation between the pen position and the touch position is the special positional relation, and when the processor determines that the positional relation between the pen position and the touch position is the special positional relation, the processor performs the predetermined process associated with the special positional relation. For example, the predetermined process may be a process of switching between a writing mode and an eraser mode, which are process modes with respect to an input of a pen indicating position from the electronic pen.

Therefore, the input apparatus configured as above can perform the predetermined process, such as mode switching from the writing mode to the eraser mode, when the user makes the positional relation between the pen position and the touch position into the special positional relation by, for example, touching a position, with a finger, in the vicinity of a pen tip of the electronic pen held by the user, while keeping the electronic pen inputting the pen position on the input surface.

With this configuration, the user of the input apparatus can swiftly instruct the input apparatus to perform the predetermined process by performing a special operation mode such that the positional relation between the pen position and the touch position becomes the special positional relation, while keeping the electronic pen inputting the pen position. Because this configuration eliminates the need for the user to click an icon displayed on the input apparatus or press an operation button for the predetermined process, this configuration can improve operation efficiency.

DETAILED DESCRIPTION

Hereinafter, embodiments of an input apparatus according to the present disclosure will be described with reference to the drawings.

First Embodiment

Figure 1:
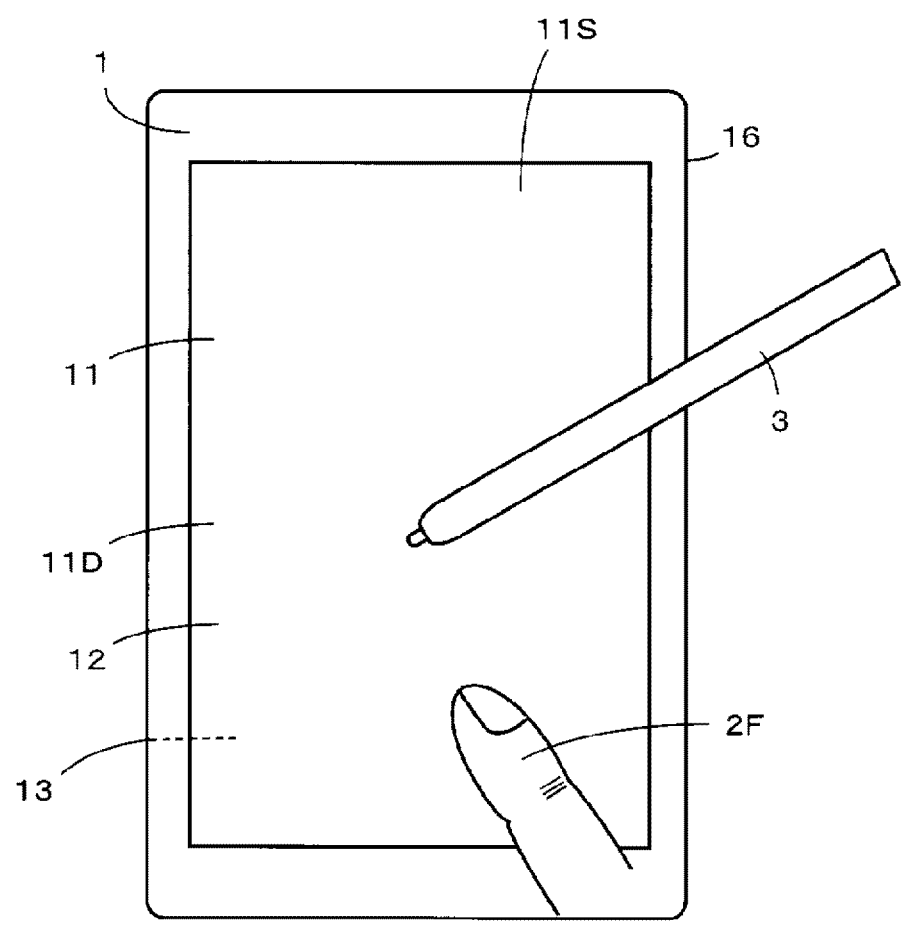
FIG. 1 is a view for describing an example of a configuration of an external appearance of an input apparatus according to a first embodiment of the present disclosure.
Figure 2:
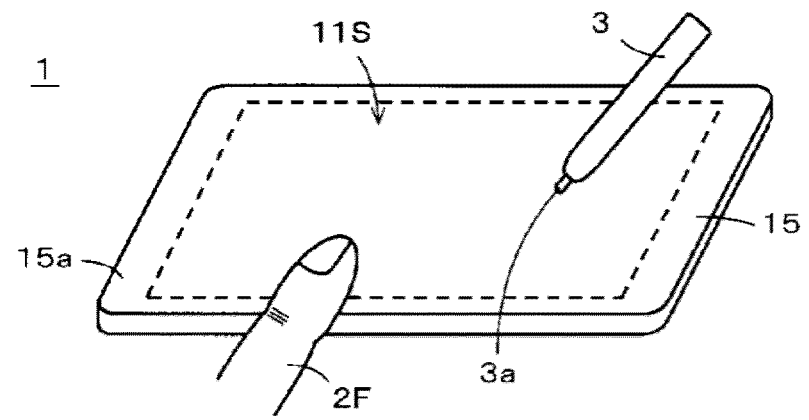
FIG. 2 is an exploded perspective view for describing an example of a hardware configuration of the input apparatus according to the first embodiment of the present disclosure.
Figure 2:
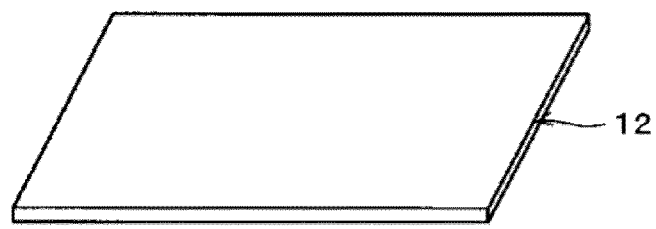
Figure 2:
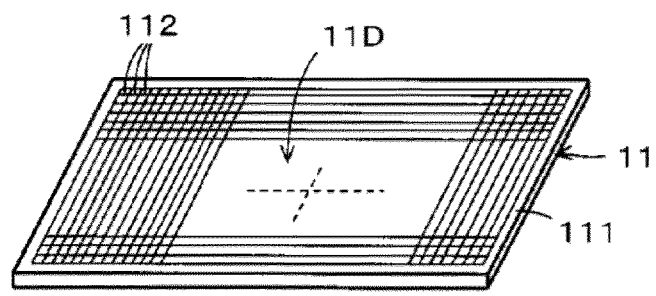
Figure 2:
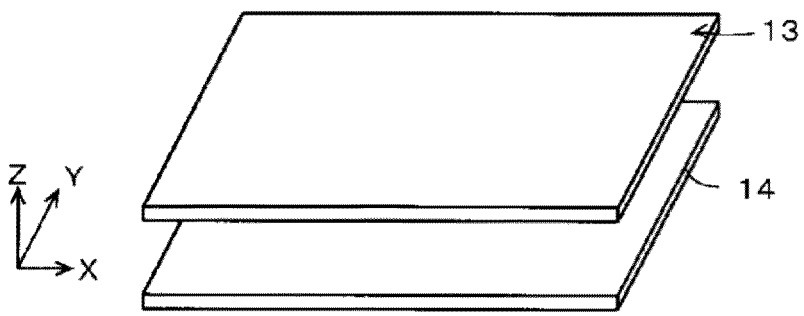
Figure 2:
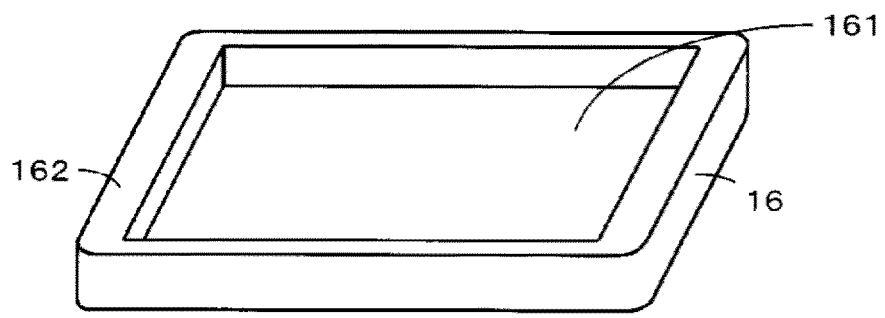

FIG. 1 illustrates an external appearance of an input apparatus 1 according to a first embodiment of the present disclosure. FIG. 2 is an exploded perspective view of an example of a configuration of the input apparatus 1 according to the first embodiment.

As illustrated in FIG. 1, the input apparatus 1 according to the first embodiment includes a display screen 11D on one surface side of a thin and rectangular housing 16. The input apparatus 1 according to the first embodiment is a pad-type terminal capable of detecting a pen indicating position and a touch position while using the entire display region of the display screen 11D as an input surface 11S, which is an input region that receives a user's input operation. The pen indicating position is a position indicated by a pen tip 3a of an electronic pen 3 on the input surface 11S. The touch position is a position touched by a finger 2F of the user on the input surface 11S. The finger 2F and the pen tip 3a of the electronic pen 3 are examples of a position indicator.

The input apparatus 1 according to the first embodiment includes a touch position detector and a pen indicating position detector. The touch position detector detects a touch position that is a position touched by the finger 2F of the user on the input surface 11S. The pen indicating position detector detects a pen indicating position that is a position indicated by the electronic pen 3 on the input surface 11S. The input apparatus 1 according to the first embodiment also includes a control circuit 100. The control circuit 100 performs a control process based on the touch position detected by the touch position detector and the pen indicating position detected by the pen indicating position detector. The control circuit 100 also controls a display image that is displayed on the display screen 11D.

A display device 11 includes a flat display such as a liquid crystal display or an organic electroluminescent (EL) display, for example. As illustrated in FIG. 2, the display device 11 includes the display screen 11D in which a number of display pixels 112 are arranged on a display substrate 111 both in an X-axis direction (horizontal direction) and a Y-axis direction (vertical direction) perpendicular to the X-axis direction.

As illustrated in FIG. 2, a touch detection sensor 12 and a pen indication detection sensor 13 are disposed in the input apparatus 1 according to the first embodiment. Specifically, the touch detection sensor 12 is disposed on a front surface (front side) of the display screen 11D of the display device 11 and detects a touch position touched by the finger 2F of the user on the input surface 11S. The pen indication detection sensor 13 is disposed on a back surface (back side) of the display screen 11D of the display device 11 and detects a pen indicating position indicated by the electronic pen 3 on the input surface 11S. Moreover, the control circuit 100 is formed in a control circuit board 14, which is disposed on a back side of the pen indication detection sensor 13, as illustrated in FIG. 2.

As illustrated in FIG. 2, the touch detection sensor 12, the display device 11, the pen indication detection sensor 13, and the control circuit board 14 are accommodated in a recessed portion 161 of the housing 16 so as to be superimposed on each other in a direction perpendicular to the display screen 11D. The housing 16 is made of a synthetic resin, for example. After that, a frame region 15a of a planar member 15, which is made of a transparent material such as glass or resin, is bonded to a frame region 162 of the housing 16 with, for example, an adhesive, thereby closing the recessed portion 161 of the housing 16. In this manner, the input apparatus 1 is assembled.

Thus, the region surrounded by a dotted line on the front side of the planar member 15 in FIG. 2 serves as the input surface 11S on which a desired position is indicated by the finger 2F or the pen tip 3a of the electronic pen 3. The touch detection sensor 12, the display device 11, the pen indication detection sensor 13, and the control circuit board 14 are disposed on the back side of the planar member 15.

The touch detection sensor 12 according to the first embodiment includes a position detection sensor of a capacitive coupling type. The touch position detector includes the touch detection sensor 12 and a touch position detection circuit 102, which is disposed in the control circuit board 14. The pen indication detection sensor 13 according to the first embodiment includes a position detection sensor of an electromagnetic induction type. The pen indicating position detector includes the pen indication detection sensor 13 and a pen indicating position detection circuit 103, which is disposed in the control circuit board 14.

In the first embodiment, a touch position detection region of the touch detection sensor 12, a pen indicating position detection region of the pen indication detection sensor 13, and the display region of the display screen 11D of the display device 11 are substantially the same size and disposed so as to be superimposed on each other in the direction perpendicular to the display screen 11D (input surface 11S).

Figure 3:
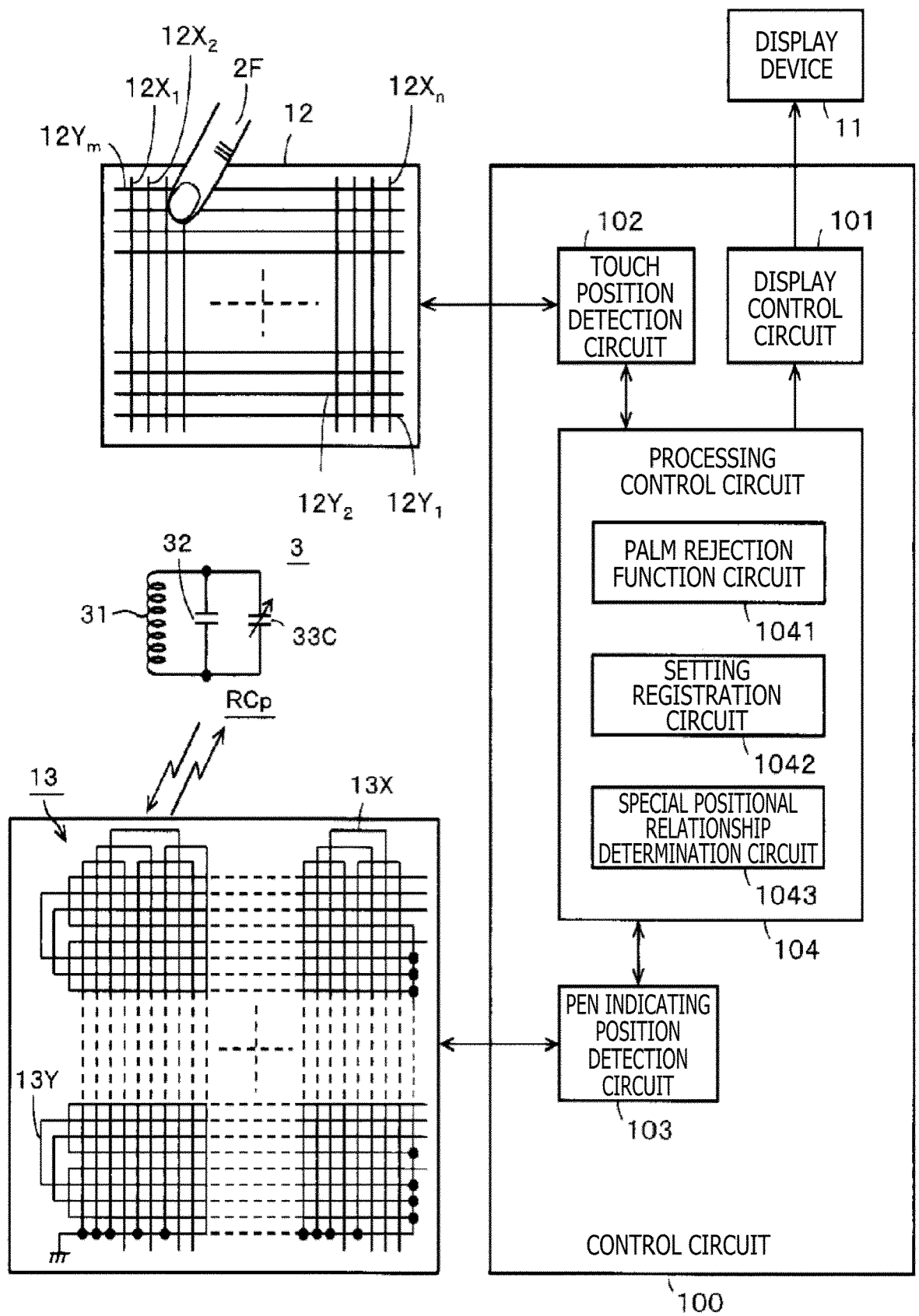
FIG. 3 is a diagram illustrating an example of an electrical configuration of the input apparatus according to the first embodiment of the present disclosure.

FIG. 3 illustrates an example of an electrical configuration of the input apparatus 1 according to the first embodiment having the hardware configuration described above. FIG. 3 also illustrates an example of an electrical configuration of the electronic pen 3 to describe signal interaction between the electronic pen 3 and the input apparatus 1.

As illustrated in FIG. 3, the input apparatus 1 according to the first embodiment includes, as described above, the display device 11, the touch detection sensor 12, and the pen indication detection sensor 13, which are connected to the control circuit 100 formed in the control circuit board 14.

In the control circuit 100, a display control circuit 101, the touch position detection circuit 102, and the pen indicating position detection circuit 103 are connected to a processing control circuit 104. The processing control circuit 104 according to the first embodiment includes a computer (microprocessor) and is capable of controlling the entire operation of the input apparatus 1 according to the first embodiment. In other words, the processing control circuit 104 includes a processor and a memory storing instructions that, when executed by the processor, causes the processing control circuit 104 to perform the acts described herein.

The display device 11 is connected to the display control circuit 101. The touch detection sensor 12 is connected to the touch position detection circuit 102. The pen indication detection sensor 13 is connected to the pen indicating position detection circuit 103.

Although not illustrated in FIG. 2, the touch position detection circuit 102 and the pen indicating position detection circuit 103 of the control circuit 100 formed in the control circuit board 14 are electrically connected to the touch detection sensor 12 and the pen indication detection sensor 13, respectively, by flexible cables, for example. Further, the display control circuit 101 of the control circuit 100 is electrically connected to the display device 11 by a flexible cable, for example.

As illustrated in FIG. 3, in this example, the touch detection sensor 12 includes a plurality of linear X conductors 12X1 to 12Xn (n=1, 2, . . . ) and a plurality of linear Y conductors 12Y1 to 12Ym (m=1, 2, . . . ). Specifically, the plurality of linear X conductors 12X1 to 12Xn is arranged on one surface of an insulating substrate in the X-axis direction (e.g., the horizontal direction). The plurality of linear Y conductors 12Y1 to 12Ym is arranged on the other surface of the insulating substrate in the Y-axis direction (e.g., the vertical direction) so as to intersect with the plurality of linear X conductors 12X1 to 12Xn at right angles. The plurality of linear X conductors 12X1 to 12Xn and the plurality of linear Y conductors 12Y1 to 12Ym are capacitively coupled at intersection positions through the insulating substrate.

The touch position detection circuit 102 includes a transmission circuit and a reception circuit. The transmission circuit transmits a transmission signal for detecting a touch made by the finger 2F. For example, the transmission circuit of the touch position detection circuit 102 is connected to the Y conductors 12Y1 to 12Ym of the touch detection sensor 12, while the reception circuit of the touch position detection circuit 102 is connected to the X conductors 12X1 to 12Xn of the touch detection sensor 12. For example, a spreading code is used as the transmission signal for detecting a touch made by the finger 2F.

The transmission signal transmitted from the transmission circuit of the touch position detection circuit 102 to the Y conductors 12Y1 to 12Ym of the touch detection sensor 12 is received by the reception circuit of the touch position detection circuit 102 through a capacitance between the Y conductors 12Y1 to 12Ym and the X conductors 12X1 to 12Xn of the touch detection sensor 12 and the X conductors 12X1 to 12Xn.

In this case, since part of the transmission signal flows through the human body at the touch position touched by the finger 2F on the touch detection sensor 12, the level of a reception signal detected by the reception circuit is reduced at this touch position. To detect the position on the touch detection sensor 12 where the level of the reception signal is low, the touch position detection circuit 102 monitors a correlation between the transmission signal and the reception signal. The touch position detection circuit 102 is also capable of detecting positions touched by a plurality of fingers at a plurality of different positions on the input surface 11S at the same time (within a predetermined period of time). The touch position detection circuit 102 supplies information about the detected touch position(s) to the processing control circuit 104.

As illustrated in FIG. 3, the pen indication detection sensor 13 includes a plurality of X-axis direction loop coils 13X and a plurality of Y-axis direction loop coils 13Y. Specifically, the plurality of X-axis direction loop coils 13X is arranged in the X-axis direction, while the plurality of Y-axis direction loop coils 13Y is arranged in the Y-axis direction. The pen indication detection sensor 13 is disposed on the back side of the display screen 11D of the display device 11 so as to be superimposed on the display device 11 and the touch detection sensor 12 and detects the position indicated by the electronic pen 3 on the input surface 11S. In other words, both the touch detection sensor 12 and the pen indication detection sensor 13 are disposed so as to detect a coordinate position on the input surface 11S.

As illustrated in FIG. 3, the electronic pen 3 of an electromagnetic induction coupling type in this example includes a resonant circuit RCp, which includes a coil 31 and a capacitor 32. In this example, the electronic pen 3 includes a pen pressure detector that detects a pen pressure applied to the pen tip 3a of a core body of the electronic pen 3 as a change in the capacitance. A variable capacitor 33C, which is included in the pen pressure detector, is connected in parallel to the coil 31 so as to constitute part of the resonant circuit RCp.

The pen indicating position detection circuit 103 transmits an alternating current (AC) signal with a frequency equal to a resonance frequency of the resonant circuit RCp of the electronic pen 3 to the electronic pen 3 through the X-axis direction loop coils 13X and the Y-axis direction loop coils 13Y of the pen indication detection sensor 13. In the electronic pen 3, the resonant circuit RCp receives the AC signal from the pen indication detection sensor 13 by electromagnetic induction coupling between the X-axis direction loop coils 13X and the Y-axis direction loop coils 13Y of the pen indication detection sensor 13 and feeds back the received AC signal to the pen indication detection sensor 13.

The pen indicating position detection circuit 103 receives the AC signal fed back from the electronic pen 3 through the pen indication detection sensor 13 and detects the positions of the X-axis direction loop coil 13X and the Y-axis direction loop coil 13Y of the pen indication detection sensor 13 that have detected the received AC signal, thereby detecting the position indicated by the pen tip 3a of the core body of the electronic pen 3.

In the electronic pen 3, the capacitance of the variable capacitor 33C, which is included in the pen pressure detector, changes according to the pen pressure applied to the pen tip 3a of the core body. Thus, the frequency of the AC signal fed back from the resonant circuit RCp of the electronic pen 3 to the pen indication detection sensor 13 changes according to the capacitance of the variable capacitor 33C. The pen indicating position detection circuit 103 synchronously detects the received AC signal with a signal with a transmission frequency and detects a change in the AC signal frequency (phase change), thereby detecting the pen pressure applied to the pen tip 3a of the core body of the electronic pen 3. The pen indicating position detection circuit 103 supplies coordinate information, which indicates the detected pen indicating position, and pen pressure information, which indicates the detected pen pressure, to the processing control circuit 104.

The processing control circuit 104 detects whether or not the pen tip 3a of the electronic pen 3 is in contact with the input surface 11S or whether or not the pen tip 3a is above the input surface 11S with no contact with the input surface 11S (this state is called a hovering state), based on the pen pressure information received from the pen indicating position detection circuit 103. Then, the processing control circuit 104 includes information about the detected contact state, which is the result of the detection, into the information about the pen indicating position detected by the pen indicating position detection circuit 103. In the first embodiment, the pen indicating position detection circuit 103 is capable of detecting not only the coordinate information indicating the position of the pen tip 3a of the electronic pen 3 contacting the input surface 11S but also coordinate information indicating the position of the pen tip 3a of the electronic pen 3 in the hovering state.

As a process based on the touch position touched by the finger 2F and detected by the touch position detection circuit 102 and the pen indicating position detected by the pen indicating position detection circuit 103, the processing control circuit 104 performs a process similar to a process performed by a known input apparatus. Additionally, in the first embodiment, the processing control circuit 104 monitors a positional relation between the pen indicating position and the touch position. When the processing control circuit 104 determines that the positional relation between the pen indicating position and the touch position becomes a predetermined positional relation, the processing control circuit 104 performs a predetermined process, such as mode switching, associated with the predetermined positional relation.

As the process similar to the process of a known input apparatus, the processing control circuit 104, for example, generates an image of a writing trajectory based on pen indicating positions indicated by the electronic pen 3 and supplies the image to the display device 11 through the display control circuit 101, thereby displaying the writing trajectory on the display screen 11D. As another process example, the processing control circuit 104 determines an application program corresponding to an icon displayed at the position indicated by the pen tip 3a of the electronic pen 3 or touched by the finger 2F and activates the application program.

Description of Key Features of Input Apparatus 1 According to First Embodiment

A special operation mode is registered in the input apparatus 1 according to the first embodiment. The special operation mode is such a mode of operation that is not performed by the user holding the electronic pen 3 at the time of a normal writing input operation. Specifically, the special operation mode is such a mode of operation that the pen indicating position indicated by the electronic pen 3 and the touch position are to be detected on the input surface 11S at the same time (within the predetermined period of time) and that the positional relation between the pen indicating position and the touch position satisfies (exhibits) the predetermined positional relation that does not occur at the time of the normal writing input operation. Hereinafter, the predetermined positional relation will be referred to as a special positional relation. In the first embodiment, the special positional relation that does not occur at the time of the normal writing input operation is determined in advance; the special positional relation is a positional relation in which the separation distance between the pen indicating position and the touch position is equal to or less than a predetermined distance, e.g., 3 cm.

One example of the user's special operation mode that satisfies the special positional relation in the input apparatus 1 according to the first embodiment will be described with reference to FIGS. 4A and 4B.

Assume that the user is holding the electronic pen 3 with a hand 2H and writing on the display screen 11D (input surface 11S) with the electronic pen 3. In this case, as illustrated in FIG. 4A, when the pen tip 3a of the electronic pen 3 contacts the input surface 11S, a palm 2Ha or a little finger 2Fa of the hand 2H holding the electronic pen 3 may touch the input surface 11S. Hereinafter, the palm 2Ha or the little finger 2Fa touching the input surface 11S will be referred to as a palm. Considering that the user does not intend to input any touch indication by making the palm touch on the input surface 11S, a conventionally available function (e.g., Japanese Patent Laid-open No. 2012-221358) determines that the touch of the palm such as the palm 2Ha or the little finger 2Fa on the input surface 11S is not an input operation and thus ignores (invalidates) the detected touch. Hereinafter, this function will be referred to as a palm rejection function.

In the input apparatus 1 according to the first embodiment as well, as illustrated in FIG. 3, the processing control circuit 104 of the control circuit 100 includes a palm rejection function circuit 1041, which performs the palm rejection function. The palm rejection function circuit 1041 has a configuration similar to a configuration of a palm rejection function circuit disclosed in, for example, Japanese Patent Laid-open No. 2012-221358. The palm rejection function circuit 1041 preliminarily registers and stores, for each user, a positional relation between the detected palm position and the pen indicating position indicated by the electronic pen 3 when an indication input operation is performed by the user holding the electronic pen 3 with the hand. When the indication input operation is actually performed by the user with the electronic pen 3, the palm rejection function circuit 1041 refers to the registered positional relation and ignores the detected palm even if the palm is detected.

Note that the method employed by the palm rejection function circuit 1041 provided in the processing control circuit 104 of the control circuit 100 according to the first embodiment is not limited to the method disclosed in Japanese Patent Laid-open No. 2012-221358. Insofar as the palm rejection function circuit 1041 is able to detect and ignore the palm, the palm rejection function circuit 1041 may employ any palm rejection method. For example, the palm rejection function circuit 1041 may detect the area of a portion at a detected touch position, and when the area of this portion is larger than that of a touch position touched by a fingertip to a distinguishable degree, the palm rejection function circuit 1041 may determine that the detected touch is made by the palm and thus ignore the touch position. Alternatively, the palm rejection function circuit 1041 may employ multiple methods in combination.

The special operation mode satisfying the special positional relation according to the first embodiment is such a mode of operation that the touch position at this time is not ignored (invalidated) by the palm rejection function circuit 1041 in the positional relation between this touch position and the pen indicating position indicated by the electronic pen 3 that have been detected on the input surface 11S at the same time (within the predetermined period of time).

Figure 4A:
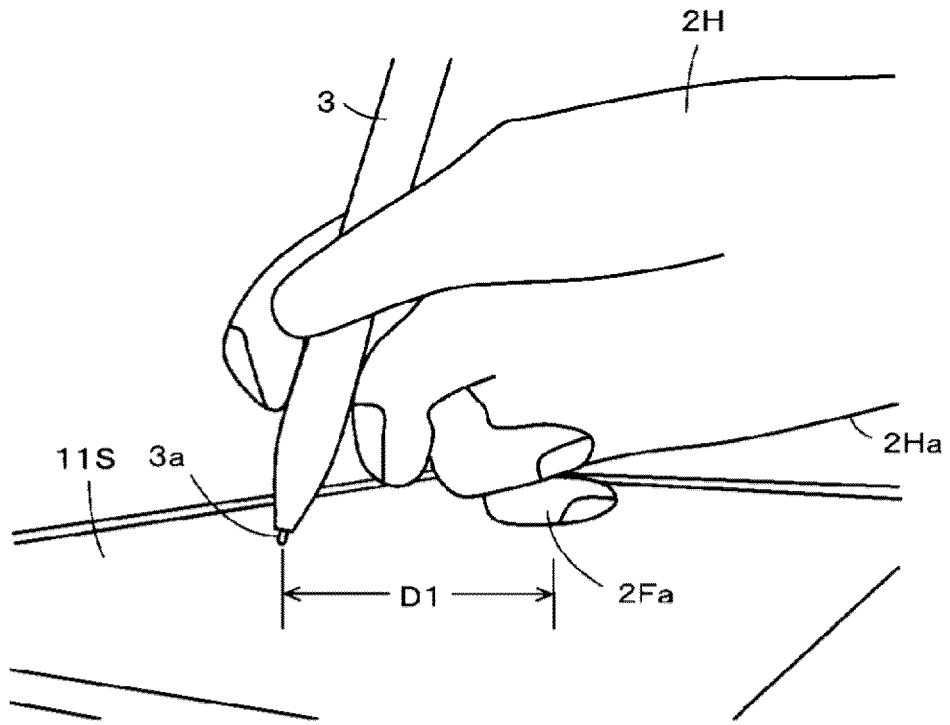
FIGS. 4A and 4B are views for describing key features of the input apparatus according to the first embodiment of the present disclosure.

As illustrated in FIG. 4A, a separation distance D1 between the pen indicating position, which is based on the contact of the pen tip 3a of the electronic pen 3 with the input surface 11S, and the touch position touched by the palm, such as the little finger 2Fa or the palm 2Ha, is relatively large, e.g., approximately 3 cm, in general. Thus, when the pen indicating position and the touch position are detected at the same time (within the predetermined period of time) and the separation distance between the pen indicating position and the touch position is determined to be equal to or less than 3 cm, the touch position is an input of the touch position that is not ignored by the palm rejection function circuit 1041.

Such a mode of operation of touching a position in the vicinity of the pen indicating position with a finger, that is, touching a position the predetermined distance, e.g., 3 cm or less, away from the pen indicating position, is not a normal operation mode but the special operation mode. Such a positional relation that the separation distance between the pen indicating position and the touch position is equal to or less than the predetermined distance, e.g., 3 cm, is the special positional relation.

When holding the electronic pen 3, some users may hold the electronic pen 3 at least between their thumbs and index fingers, resting the electronic pen 3 on their middle fingers. Other users may hold the electronic pen 3 between their thumbs and index fingers without resting the electronic pen 3 on their middle fingers. In either case, the user can relatively freely move his/her middle finger and ring finger while holding the electronic pen 3. Therefore, while the user holds the electronic pen 3 with the hand, the user can touch, with his/her middle finger or ring finger of the hand holding the electronic pen 3, a position in the vicinity of the pen tip 3*a* of the electronic pen 3.

Figure 4B:
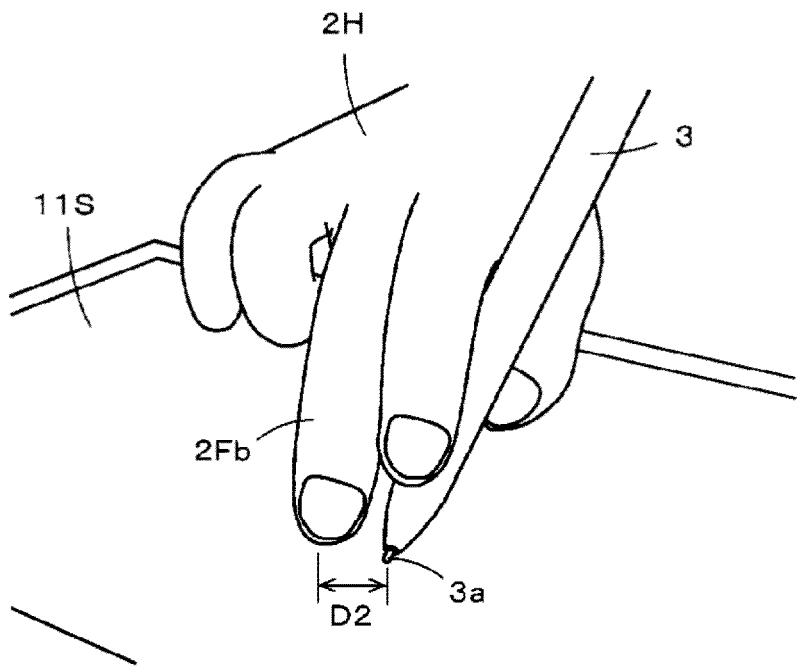

Considering this point, as illustrated in FIG. 4B, in the first embodiment, the special operation mode is such a mode of operation that the user touches a position in the vicinity of the pen tip 3*a* of the electronic pen 3 contacting the input surface 11S with a middle finger 2Fb of the hand 2H holding the electronic pen 3. In this case, as illustrated in FIG. 4B, a distance D2 between the pen indicating position indicated by the electronic pen 3 and the touch position touched by the middle finger 2Fb is smaller than the separation distance D1, which is illustrated in FIG. 4A, between the pen indicating position and the touch position touched by the palm. This mode of operation is a mode of operation that is not performed by the user at the time of a normal writing input operation using the electronic pen 3 and is therefore the special operation mode.

In this manner, in the first embodiment, the special positional relation is determined to be such a positional relation that the distance between the pen indicating position indicated by the electronic pen 3 and the touch position that have been detected at the same time (within the predetermined period of time) is equal to or less than the predetermined distance, e.g., the separation distance D1 between the pen indicating position and the touch position touched by the palm. The predetermined distance is equal to or less than, for example, 3 cm. The user can perform the special operation mode satisfying the special positional relation.

In the first embodiment, a predetermined process function is allocated to the special positional relation (special operation mode). In the first embodiment, the user can preliminarily select and register a predetermined process to be allocated to the special positional relation (special operation mode) from a plurality of processes.

In order to realize the implementation described above, the processing control circuit 104 of the control circuit 100 includes, as functional circuits, a setting registration circuit 1042 and a special positional relation determination circuit 1043, in addition to the above-described palm rejection function circuit 1041, as illustrated in FIG. 3.

The palm rejection function circuit 1041 is a functional circuit that operates as follows. That is, as described above, when the touch position is detected by the touch position detection circuit 102 while the pen indicating position indicated by the electronic pen 3 is detected by the pen indicating position detection circuit 103, the palm rejection function circuit 1041 determines whether or not the touch position detected by the touch position detection circuit 102 is touched by the palm. When the palm rejection function circuit 1041 determines that the touch position is touched by the palm, the palm rejection function circuit 1041 ignores the detected touch.

In the first embodiment, the setting registration circuit 1042 is a functional circuit that accepts registration of a process function that is selected by the user and to be allocated to the special positional relation, and stores the accepted process function.

Figure 5:
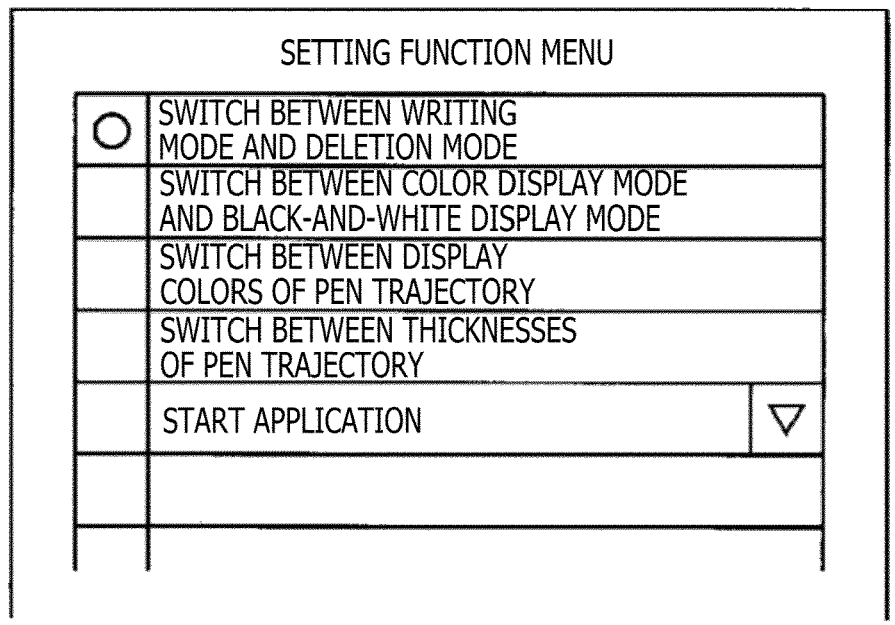
FIG. 5 is a view for describing key features of the input apparatus according to the first embodiment of the present disclosure.

FIG. 5 illustrates an example of a menu of process functions that can be selected and allocated to the special positional relation in the input apparatus 1 according to the first embodiment. In this example, as illustrated in FIG. 5, the following process functions that can be set to the special positional relation are presented to the user.

(1) a writing/deletion mode switching process that alternately switches between a writing mode and a deletion mode (eraser mode)

(2) a display color mode switching process that alternately switches the display mode of the display screen 11D between a color display mode and a black-and-white display mode (3) a pen trajectory color switching process that switches between display colors of a pen trajectory (4) a pen trajectory thickness switching process that switches between the thicknesses of the pen trajectory (5) an application start process (an application to start is selected)

The user can select one of these process functions.

Now, assume that (3) the pen trajectory color switching process is selected. In this case, each time the special operation mode satisfying the special positional relation is performed by the user, the display color of the pen trajectory is sequentially and cyclically switched between multiple colors prepared in advance. Similarly, assume that (4) the pen trajectory thickness switching process is selected. In this case, each time the special operation mode satisfying the special positional relation is performed by the user, the display thickness of the pen trajectory is sequentially and cyclically switched between multiple thicknesses prepared in advance.

Instead of cyclically switching the displays color or thicknesses as described above, (3) the pen trajectory color switching process and (4) the pen trajectory thickness switching process may be configured differently. For example, when the special operation mode satisfying the special positional relation is performed by the user, a menu of multiple colors or thicknesses may be displayed on the display screen 11D in the vicinity of the pen indicating position. From this menu, the user can touch and select desired display colors or thicknesses with a finger of the other hand that is not holding the electronic pen 3.

When (5) the application start process is selected, multiple applications that can be started are displayed as a pull-down menu. From this menu, the user can select a desired application.

Alternatively, the application that can be started may be selected when the special operation mode satisfying the special positional relation is performed by the user. Specifically, when the special operation mode satisfying the special positional relation is performed by the user, a menu of multiple applications that can be started is displayed on the display screen 11D in the vicinity of the pen indicating position. From this menu, the user can touch and select a desired application with a finger of the other hand that is not holding the electronic pen 3 to set and start the application.

Figure 6:
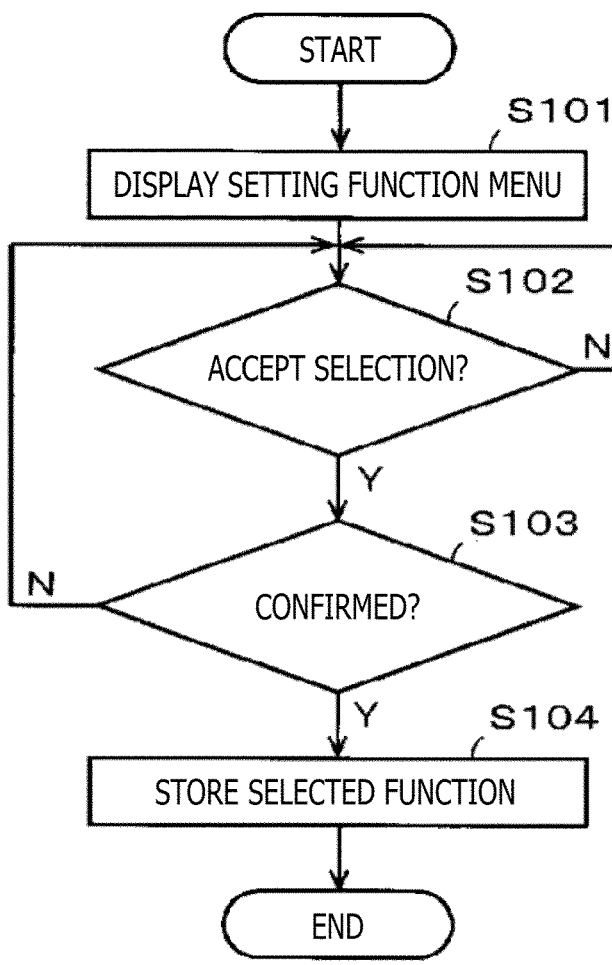
FIG. 6 is a flowchart for describing an example of a processing operation of the input apparatus according to the first embodiment of the present disclosure.

In the first embodiment, when one of the process functions to be registered is touched by the user or indicated by the electronic pen 3 on the input surface 11S, the processing control circuit 104 of the control circuit 100 activates the setting registration circuit 1042, causing the setting registration circuit 1042 to perform a processing operation illustrated in a flowchart of FIG. 6.

The setting registration circuit 1042 displays the setting function menu illustrated in FIG. 5 on the display screen 11D (S101). The setting registration circuit 1042 stands by until the user selects a process function from the setting function menu and the user's selection is accepted (S102). When the setting registration circuit 1042 determines at S102 that the user has selected a process function from the setting function menu and the user's selection has been accepted, the setting registration circuit 1042 determines whether or not the selected process function has been confirmed by the user's operation (S103).

When the setting registration circuit 1042 determines at S103 that the selected process function has not been confirmed, the setting registration circuit 1042 returns the processing to S102 and repeats the processes at and after S102. When the setting registration circuit 1042 determines that the selected process function has been confirmed, the setting registration circuit 1042 accepts the registration of the selected process function and stores the selected process function in a storage (S104). Then, the setting registration circuit 1042 ends the processing routine illustrated in FIG. 5.

When the pen indicating position detected by the pen indicating position detection circuit 103 and the touch position detected by the touch position detection circuit 102 are detected at the same time (within the predetermined period of time), the special positional relation determination circuit 1043 of the control circuit 100 determines whether or not the positional relation between the pen indicating position and the touch position at this time is the special positional relation. As described above, in the first embodiment, the positional relation is determined to be the special positional relation, depending on whether or not the distance between the pen indicating position and the touch position is equal to or less than, for example, 3 cm. When the special positional relation determination circuit 1043 determines that the distance between the pen indicating position and the touch position is equal to or less than 3 cm and thus the positional relation between the pen indicating position and the touch position is the special positional relation, the special positional relation determination circuit 1043 performs a predetermined process registered in the setting registration circuit 1042 in association with the special positional relation. The predetermined process performed here is any of the predetermined processes (1) to (5) exemplified above.

Example of Processing Operation of Processing Control Circuit 104

An example of a processing operation of the processing control circuit 104 of the control circuit 100 configured as above will be described with reference to a flowchart of FIG. 7.

The processing control circuit 104 monitors a detection output of the pen indicating position detection circuit 103 and determines whether or not the pen indicating position has been detected (S111). Note that the pen indicating position detected here may be the position indicated by the electronic pen 3 in the hovering state.

When the processing control circuit 104 determines at S111 that the pen indicating position has not been detected, the processing control circuit 104 monitors a detection output of the touch position detection circuit 102 and determines whether or not the touch position has been detected (S112). When the processing control circuit 104 determines at S112 that the touch position has not been detected, the processing control circuit 104 returns the processing to S111. When the processing control circuit 104 determines at S112 that the touch position has been detected, the processing control circuit 104 uses the function of the palm rejection function circuit 1041 to determine whether or not the touch is made by the palm (S113). When it is determined that the touch is made by the palm, the processing control circuit 104 ignores the detected touch position and returns the processing to S111.

When it is determined in S113 that the touch is not made by the palm but is a touch indication made by a finger, the processing control circuit 104 performs a normal process corresponding to the detected touch position (S114). After the process, the processing control circuit 104 returns the processing to S111.

When the processing control circuit 104 determines at S111 that the pen indicating position has been detected, the processing control circuit 104 determines whether or not the touch position has been detected at the same time (within the predetermined period of time) (S115). When the processing control circuit 104 determines at S115 that the touch position has not been detected at the same time (within the predetermined period of time), the processing control circuit 104 performs a normal process corresponding to the detected pen indicating position (S116). After the process, the processing control circuit 104 returns the processing to S111.

When the processing control circuit 104 determines at S115 that the touch position has been detected at the same time (within the predetermined period of time), the processing control circuit 104 uses the function of the palm rejection function circuit 1041 to determine whether or not the touch is made by the palm (S117). When it is determined that the touch is made by the palm, the processing control circuit 104 ignores the detected touch position and proceeds to S116. At S116, the processing control circuit 104 performs the normal process corresponding to the detected pen indicating position. After the process, the processing control circuit 104 returns the processing to S111.

When it is determined at S117 that the touch is not made by the palm but is a touch indication made by a finger, the processing control circuit 104 uses the function of the special positional relation determination circuit 1043 to calculate the distance between the detected pen indicating position and touch position (S118) and determine whether or not the calculated distance is equal to or less than a predetermined value, e.g., 3 cm, (S119).

When it is determined at S119 that the calculated distance is not equal to or less than the predetermined value, the processing control circuit 104 performs a normal process corresponding to the pen indicating position and a normal process corresponding to the touch position (S120). After S120, the processing control circuit 104 returns the processing to S111 and repeats the processes at and after S111.

When it is determined at S119 that the calculated distance is equal to or less than the predetermined value, the processing control circuit 104 performs one of the process functions (1) to (5) that is registered and stored in the setting registration circuit 1042 (S121). After S121, the processing control circuit 104 returns the processing to S111 and repeats the processes at and after S111.

As described above, with the input apparatus 1 according to the first embodiment, when the user is writing on the input surface 11S with the electronic pen 3 held by the user, the user can perform the above-described special operation mode while keeping the electronic pen 3 indicating and inputting a position on the input surface 11S. With this configuration, a predetermined process, such as mode switching from the writing mode to the deletion mode (eraser mode), set in advance in association with the special positional relation can be performed without requiring the user to perform an extra operation, such as clicking an icon, other than the writing input operation. Therefore, this configuration allows the user to swiftly perform the writing input operation.

The input apparatus 1 configured as above is particularly convenient when using an electronic pen with no side switch, i.e., an operation section exposed from a pen-shaped external case. The electronic pen with the side switch can perform mode switching by transmitting operation information of the side switch to an input apparatus. In some electronic pens emerging in recent years, however, a side switch cannot be provided since a member for performing signal interaction with a position detection sensor and an electronic-pen main body including a pen pressure detector are replaceable as a cartridge type or a refill type. When using such an electronic pen with no side switch, therefore, it is convenient for the user to be able to cause the input apparatus 1 to perform a predetermined process, such as mode switching, by performing the above-described special operation mode satisfying the special positional relation on the input surface of the position detection sensor.

Moreover, in the example illustrated in FIG. 4B, the user can perform the special operation mode satisfying the special positional relation with one-handed operation, i.e., with a finger of the hand holding the electronic pen 3. Thus, there is an effect that the user can perform the special operation mode even when the user is holding the input apparatus 1, i.e., a mobile device, with the other hand that is not holding the electronic pen 3.

Figure 7:
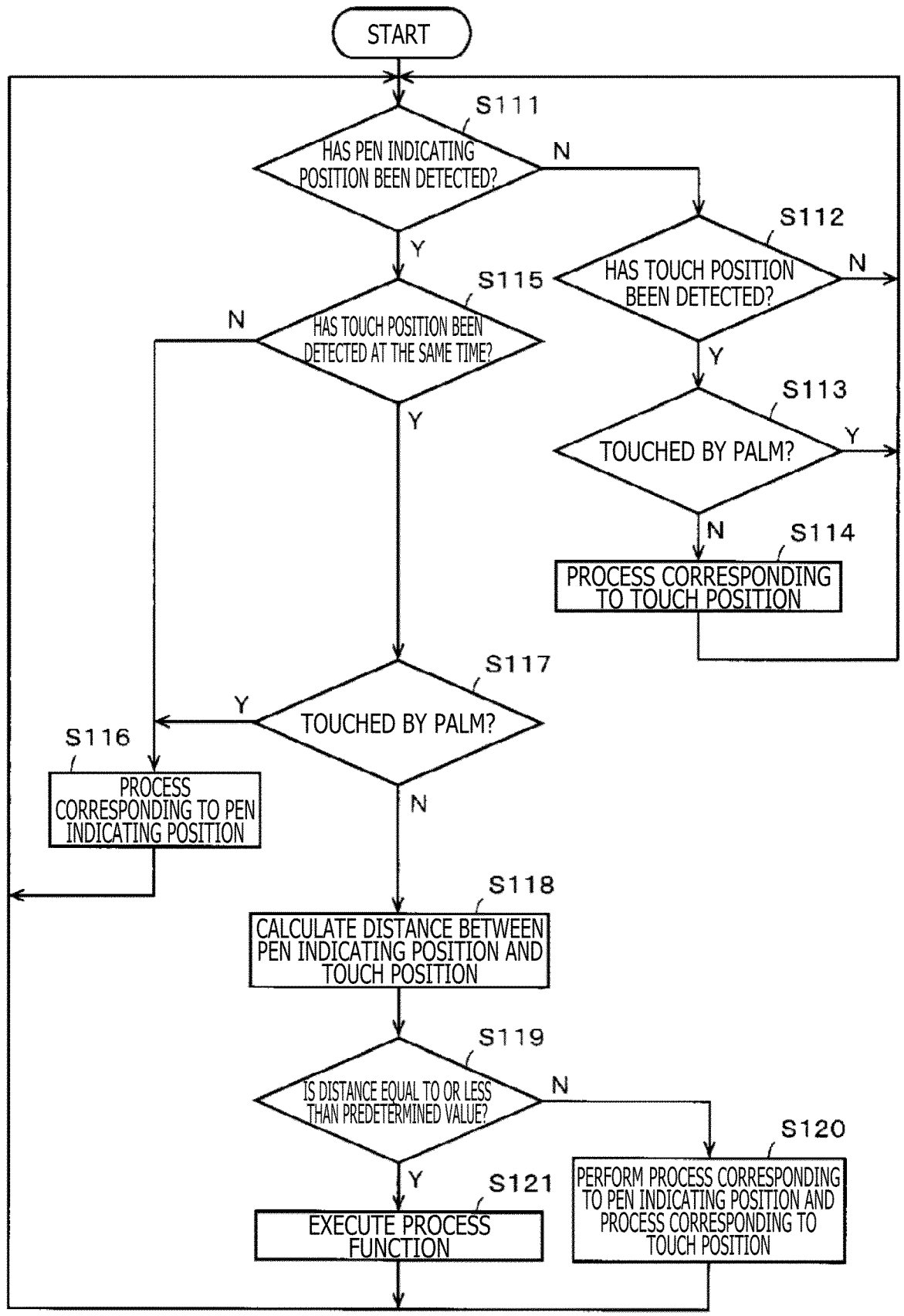
FIG. 7 is a flowchart for describing an example of a processing operation of the input apparatus according to the first embodiment of the present disclosure.

In the example illustrated in the flowchart of FIG. 7, the palm rejection function circuit 1041 determines whether or not the touch position is touched by the palm and when it is determined that the touch position is not touched by the palm, the special positional relation determination circuit 1043 determines whether or not the positional relation between the pen indicating position and the touch position is the special positional relation. Alternatively, the special positional relation determination circuit 1043 may determine whether or not the positional relation is the special positional relation depending on whether or not the distance between the pen indicating position and the touch position is equal to or less than the predetermined distance, regardless of the palm rejection.

Second Embodiment

While the input apparatus 1 according to the above-described first embodiment employs the electronic pen 3 of the electromagnetic induction coupling type as the electronic pen, the electronic pen may be of a capacitive coupling type. In a second embodiment described below, an electronic pen 3A of an active capacitive type is used as the electronic pen, so that a pen indicating position, which is a position indicated by the electronic pen 3A, and a touch position, which is a position touched by the finger 2F of the user, can be distinguishably detected.

Figure 8:
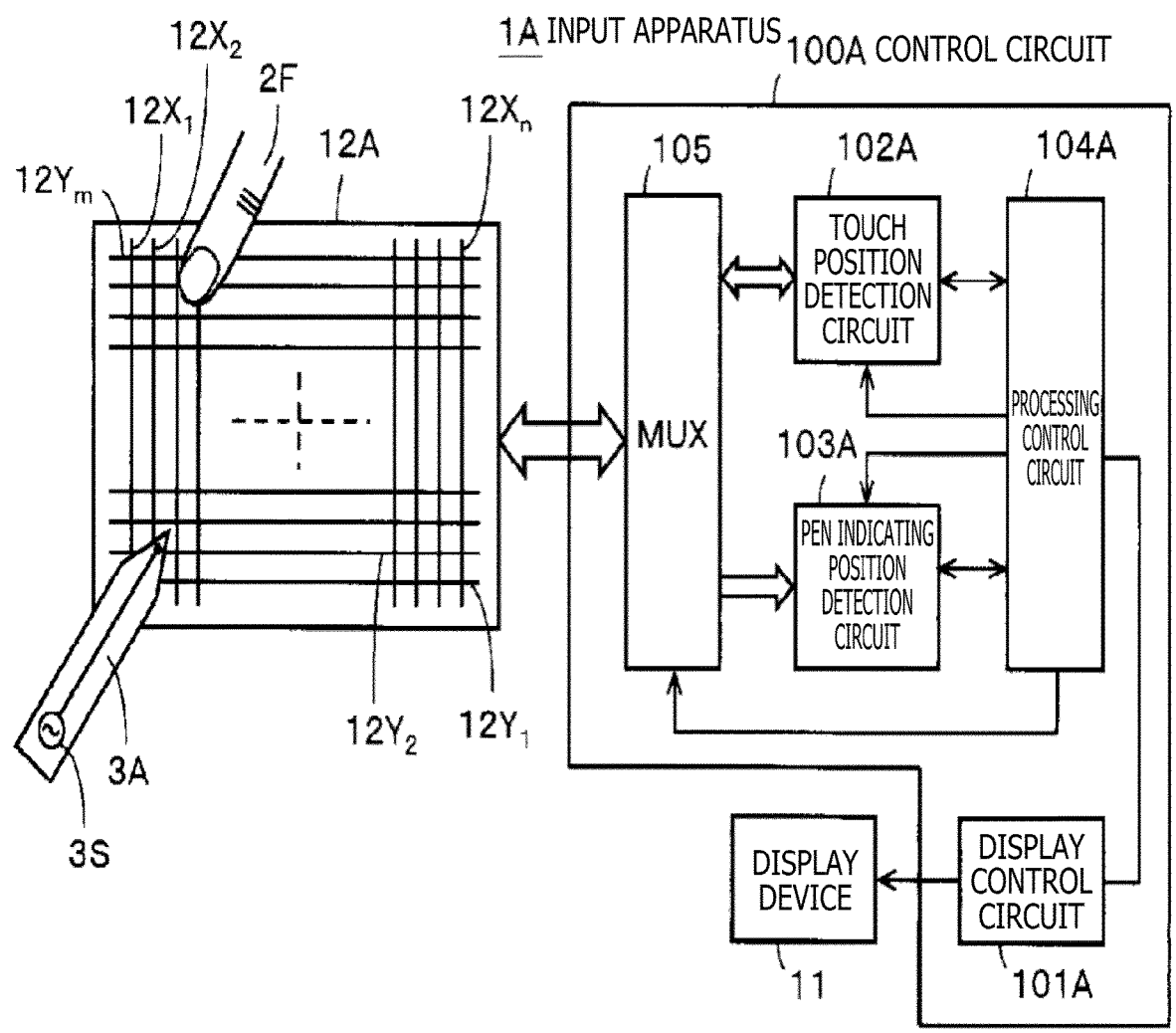
FIG. 8 is a diagram illustrating an example of an electrical configuration of an input apparatus according to a second embodiment of the present disclosure.

FIG. 8 illustrates an example of an electrical configuration of an input apparatus 1A according to the second embodiment. Although not illustrated here, a hardware configuration of the input apparatus 1A according to the second embodiment corresponds to that of the input apparatus 1 according to the first embodiment illustrated in FIG. 2, except that the pen indication detection sensor 13 is removed. Further, the electronic pen 3A of the active capacitive type is used instead of the electronic pen 3 of the electromagnetic induction coupling type.

That is, while the input apparatus 1A according to the second embodiment includes a position detection sensor 12A of the capacitive coupling type as a position detection sensor, the input apparatus 1A does not include the position detection sensor (pen indication detection sensor) 13 of the electromagnetic induction coupling type. In the second embodiment, moreover, a control circuit 100A configured as illustrated in FIG. 8 is used as a control circuit formed in the control circuit board 14. The position detection sensor 12A has a configuration similar to the configuration of the touch detection sensor 12 of the input apparatus 1 according to the first embodiment. In the second embodiment as well, the position detection sensor 12A includes the plurality of linear X conductors 12X1 to 12Xn (n=1, 2, . . . ) and the plurality of linear Y conductors 12Y1 to 12Ym (m=1, 2, . . . ). The plurality of linear X conductors 12X1 to 12Xn is arranged on one surface of an insulating substrate in the X-axis direction (e.g., the horizontal direction). The plurality of linear Y conductors 12Y1 to 12Ym is arranged on the other surface of the insulating substrate in the Y-axis direction (e.g., the vertical direction) so as to intersect with the plurality of linear X conductors 12X1 to 12Xn at right angles.

As illustrated in FIG. 8, the input apparatus 1A according to the second embodiment includes the position detection sensor 12A and the control circuit 100A connected to the position detection sensor 12A. The control circuit 100A includes a multiplexer 105, a display control circuit 101A, a touch position detection circuit 102A, a pen indicating position detection circuit 103A, and a processing control circuit 104A. The multiplexer 105 serves as an input/output interface with the position detection sensor 12A.

The multiplexer 105 serves as a switching circuit that connects the position detection sensor 12A to either the touch position detection circuit 102A or the pen indicating position detection circuit 103A under the switching control of the processing control circuit 104A.

The touch position detection circuit 102A has a configuration similar to the configuration of the touch position detection circuit 102 according to the first embodiment and is capable of detecting positions touched by a plurality of fingers 2F at a plurality of different positions on the input surface 11S at the same time (within the predetermined period of time). In the second embodiment, a touch position detection function of the touch position detection circuit 102A uses a transmission signal (a spreading code in this example) with a frequency f1 of approximately 50 to 200 kHz, for example.

The pen indicating position detection circuit 103A detects a pen indicating position that is a position indicated by the electronic pen 3A on the position detection sensor 12A, i.e., the input surface 11S. Hereinafter, the electronic pen 3A will be occasionally referred to as the active capacitive pen 3A.

As illustrated in FIG. 8, the active capacitive pen 3A includes an oscillation circuit 3S inside a pen case. A signal with a frequency f2 is transmitted from the oscillation circuit 3S and then transmitted from an electrode of the pen tip of the active capacitive pen 3A. The frequency f2 is, for example, approximately 1.8 MHz and is different from the frequency f1. The oscillation circuit 3S may be an oscillator or a circuit that generates a signal obtained by performing processing such as modulation on an oscillation signal generated by an oscillator. The pen indicating position detection circuit 103A receives the signal of the active capacitive pen 3A not only from the X conductors 12X1 to 12Xn but also from the Y conductors 12Y1 to 12Ym of the position detection sensor 12A.

The pen indicating position detection circuit 103A checks how strong the 1.8-MHz signal received from the active capacitive pen 3A is in each of the X conductors 12X1 to 12Xn and the Y conductors 12Y1 to 12Ym, and detects the X conductor 12X and the Y conductor 12Y in which the level of the 1.8-MHz signal is high, thereby detecting the pen indicating position indicated by the active capacitive pen 3A. After that, the pen indicating position detection circuit 103A supplies the result of the detection of the pen indicating position indicated by the active capacitive pen 3A to the processing control circuit 104A.

As described above, in order to detect the pen indicating position indicated by the active capacitive pen 3A and the touch position touched by the finger 2F, the touch position detection function of the touch position detection circuit 102A handles the signal with the frequency f1 of 50 to 200 kHz, while the pen indicating position detection circuit 103A handles the signal with the frequency f2 of 1.8 MHz. Since the usable frequency bands are significantly different from each other, the signal handled by the touch position detection circuit 102A and the signal handled by the pen indicating position detection circuit 103A can be band-separated by a band-pass filter, for example.

Figure 9:
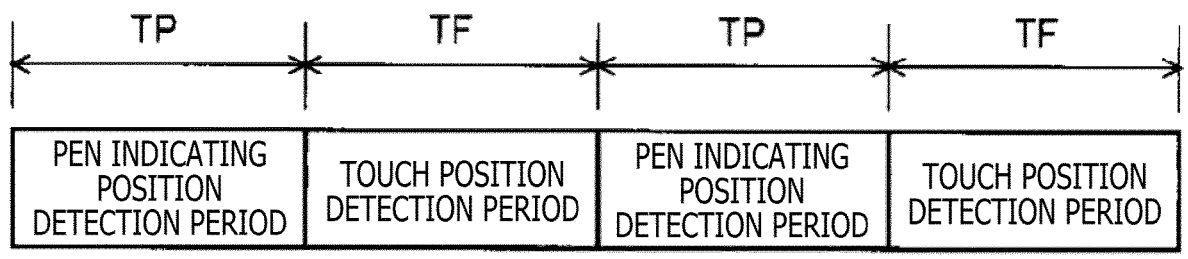
FIG. 9 is a diagram for describing an example of a processing operation of the input apparatus according to the second embodiment of the present disclosure.

The processing control circuit 104A includes a computer (microprocessor) as in the processing control circuit 104 according to the first embodiment. The input apparatus 1A according to the second embodiment detects the touch position and the pen indicating position in a time-division manner. Specifically, as illustrated in FIG. 9, the input apparatus 1A according to the second embodiment alternately switches a pen indicating position detection period TP and a touch position detection period TF in a time-division manner to detect the pen indicating position during the pen indicating position detection period TP and the touch position during the touch position detection period TF.

During the pen indicating position detection period TP, the processing control circuit 104A controls the multiplexer 105 so as to connect the position detection sensor 12A to the pen indicating position detection circuit 103A, while controlling the pen indicating position detection circuit 103A to be in an operation state (active state).

During the touch position detection period TF, the processing control circuit 104A controls the multiplexer 105 so as to connect the position detection sensor 12A to the touch position detection circuit 102A, while controlling the touch position detection circuit 102A to be in an operation state (active state).

In this manner, the processing control circuit 104A controls timing of the time-division processing between the pen indicating position detection period TP and the touch position detection period TF and, at the same time, controls switching between a finger vicinity detection function and the touch position detection function during the touch position detection period TF. With this configuration according to the second embodiment, the position indication by the finger 2F and the position indication by the active capacitive pen 3A can be detected substantially at the same time (within the predetermined period of time).

The processing control circuit 104A of the input apparatus 1A according to the second embodiment includes functional circuits similar to the palm rejection function circuit 1041, the setting registration circuit 1042, and the special positional relation determination circuit 1043 of the processing control circuit 104 according to the first embodiment. In the second embodiment as well, the processing control circuit 104A performs processing similar to the processing illustrated in FIG. 7 to process the pen indicating position indicated by the electronic pen 3A and detected by the pen indicating position detection circuit 103A and the touch position detected by the touch position detection circuit 102A.

The input apparatus 1A according to the second embodiment configured as above employs the electronic pen 3A of the capacitive coupling type in this manner. As in the first embodiment, while keeping the electronic pen 3A indicating and inputting a position on the input surface 11S, the user can perform the special operation mode satisfying the above-described special positional relation so that a predetermined process set in advance in association with the special positional relation can be performed. This configuration allows the user to swiftly perform the writing input operation.

Moreover, since the input apparatus 1A according to the second embodiment includes the position detection sensor 12A of the capacitive coupling type that serves as the position detection sensor for detecting the pen indicating position and the touch position, the hardware configuration of the input apparatus 1A according to the second embodiment is simplified compared to the hardware configuration of the input apparatus 1 according to the first embodiment. This configuration, therefore, reduces production cost.

Other Embodiments or Modifications

In the first and second embodiments, as exemplified in FIG. 4B, the special operation mode is such a mode of operation that the user touches a position in the vicinity of the pen tip with the middle finger of the hand holding the electronic pen 3 or 3A. However, the special operation mode satisfying the special positional relation is not limited to the mode illustrated in FIG. 4B and may be any other mode insofar as the touch is not detected as the palm by the palm rejection function circuit and the distance between the pen indicating position and the touch position is equal to or less than the predetermined distance, e.g., 3 cm in the above-described embodiments, that is shorter than the distance between the pen indicating position and the palm position that are detected while a pen indication is input by the user with the electronic pen 3 or 3A.

For example, the special operation mode may be such a mode of operation that the user touches a position in the vicinity of the pen tip of the electronic pen 3 or 3A with the ring finger of the hand holding the electronic pen 3 or 3A, instead of with the middle finger 2Fb of the hand holding the electronic pen 3 or 3A as illustrated in FIG. 4B. Alternatively, the special operation mode may be such a mode of operation that the user touches a position in the vicinity of the pen tip of the electronic pen 3 or 3A with any of the fingers, e.g., the index finger or the middle finger, of the other free hand, instead of with a finger of the hand holding the electronic pen 3 or 3A. The position touched with a finger of the other free hand is the position on the input surface 11S that is in the vicinity of the pen tip of the electronic pen 3 or 3A inputting a pen indication and satisfies the special positional relation.

Since there are multiple choices for the special operation mode in this manner, the user may register a special operation mode easier for the user in the control circuit 100 or 100A. In this case, before or after the setting registration circuit of the control circuit 100 or 100A accepts selection and registration of a process function described with reference to FIG. 6, the control circuit 100 or 100A accepts the special operation mode input by the user on the input surface 11S and then registers and stores the positional relation between the pen indicating position and the touch position at this time.

In this case, the control circuit 100 or 100A determines whether or not the mode of operation input by the user can be the special operation mode by determining whether or not the touch is not determined as the palm by the palm rejection function circuit, for example. The control circuit 100 or 100A notifies the user of the result of the determination through the display screen 11D, for example. When the control circuit 100 or 100A determines that the mode of operation input by the user can be the special operation mode, the control circuit 100 or 100A accepts the input mode of operation as the special operation mode and registers and stores the positional relation between the pen indicating position and the touch position at this time.

This configuration is convenient since the user can check whether or not the mode of operation input by the user can be used as the special operation mode. Moreover, when the user is notified of the result of the determination that the mode of operation input by the user is not usable as the special operation mode, the user can input another possible special operation mode. This configuration is also convenient in this respect.

Moreover, considering that there are multiple choices for the special operation mode as described above, different process functions may be set and registered for different special operation modes.

In this case, a difference in the direction of the touch position relative to the pen indicating position on the input surface 11S may be used to differentiate special operation modes. This means that not only the above-described distance between the pen indicating position and the touch position but also a difference in the direction of the touch position relative to the pen indicating position may be taken into account as the special positional relation.

For example, in the example of the special operation mode illustrated in FIG. 4B, the user touches the position to the right of and in the vicinity of the pen indicating position with the middle finger 2Fb. As a different special operation mode, the user may touch a position in front of and in the vicinity of the pen indicating position. Alternatively, as a different special operation mode, the user may touch a position to the left of and in the vicinity of the pen indicating position with, for example, the index finger of the hand that is not holding the electronic pen 3 or 3A.

Alternatively, a difference in the number of touch positions against one pen indicating position may be used to differentiate special operation modes. As illustrated in the example of FIG. 4B, one pen indicating position is indicated by the electronic pen 3 or 3A. This means that a difference in the number of touch positions against one pen indicating position may be taken into account as the special positional relation.

Figure 10:
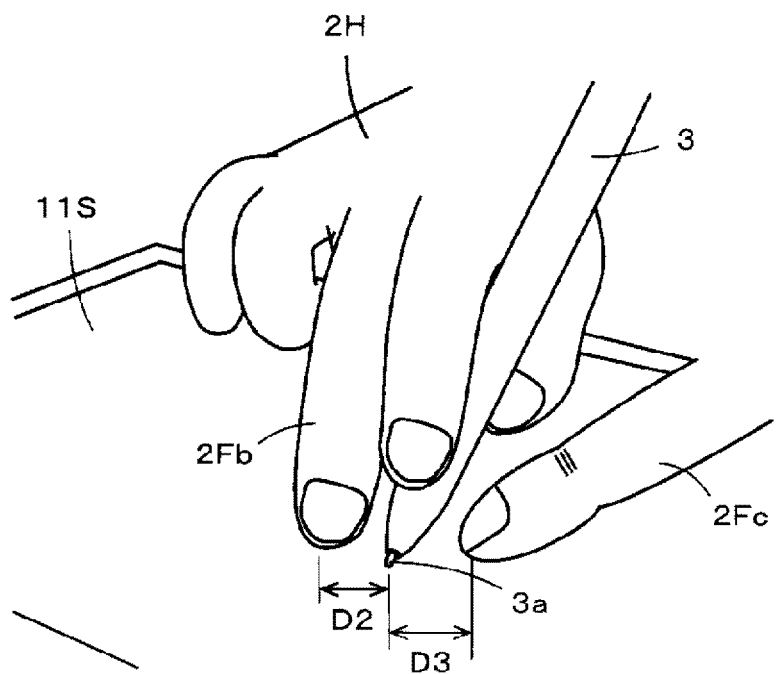
FIG. 10 is a view for describing an input apparatus according to another embodiment of the present disclosure.

For example, as illustrated in FIG. 10, the user may touch not only the position in the vicinity of the pen indicating position with the middle finger 2Fb of the hand 2H holding the electronic pen 3 or 3A as illustrated in the example of FIG. 4B, but also a position in the vicinity of the pen indicating position with one finger 2Fc of the other free hand (a distance D3 between the pen indicating position and the touch position touched by the finger 2Fc is equal to or less than 3 cm (D3<D1)). In this case, the number of touch positions satisfying the special positional relation is two against one pen indicating position. Therefore, the special operation mode illustrated in FIG. 10 can be used as a different special operation mode from the special operation mode illustrated in FIG. 4B.

Note that the user may touch two positions in the vicinity of the pen indicating position with two fingers of the free hand. Needless to say, in this special operation mode where the number of touch positions is more than one, any touch detected as the palm is not included in the touches to be counted as the touch positions.

Moreover, not only a difference in the number of touch positions against one pen indicating position but also a difference in the direction of each touch position relative to the pen indicating position may be used to differentiate special operation modes. This means that both a difference in the number of touch positions against one pen indicating position and a difference in the direction of each touch position relative to the pen indicating position may be taken into account as the special positional relation.

Moreover, a difference in the inclination of the electronic pen 3 or 3A relative to the input surface 11S may be used to differentiate special operation modes. The inclination of the electronic pen 3 or 3A may also be added as a requirement defining the special positional relation.

Allowing the registration of different special operation modes satisfying the special positional relation in association with different process functions in this manner can further improve operation efficiency and is therefore convenient.

In the first and second embodiments, the positional relation between the pen indicating position and the touch position is determined to be the special positional relation, depending on whether or not the distance between the pen indicating position and the touch position is equal to or less than the predetermined distance. Alternatively, the positional relation between the pen indicating position and the touch position may be determined to be the special positional relation, depending on whether or not the touch position is not detected as the palm by the palm rejection function circuit according to the positional relation between the pen indicating position and the touch position.

When, as described above, a difference in the direction of the touch position relative to the pen indicating position is taken into account to determine whether or not the positional relation between the pen indicating position and the touch position is the special positional relation, the positional relation is determined to be the special positional relation, depending on whether or not the distance between the pen indicating position and the touch position is equal to or less than the predetermined distance and whether or not the touch position is deviated in a predetermined direction from the pen indicating position.

When, as described above, a difference in the number of the touch positions is taken into account to determine whether or not the positional relation between the pen indicating position and the touch position is the special positional relation, the positional relation is determined to be the special positional relation, depending on whether or not the distance between the pen indicating position and the touch position is equal to or less than the predetermined distance and whether or not the number of touch positions is more than one. When a difference in the direction of each touch position relative to the pen indicating position is further taken into account in addition to a difference in the number of the touch positions, it is determined whether or not each touch position is deviated in a predetermined direction from the pen indicating position. When the inclination of the electronic pen 3 or 3A is taken into account, the inclination of the electronic pen 3 or 3A at this time is detected to determine whether or not the positional relation is the special positional relation.

It is to be noted that the embodiments of the present disclosure are not limited to the foregoing embodiments, and that various changes can be made without departing from the spirit of the present disclosure.

What is claimed is:

1. An input apparatus comprising:
a pen position detector which, in operation, detects a plurality of pen positions indicated by an electronic pen held by a user on an input surface;
a touch position detector which, in operation, detects a plurality of touch positions touched by the user on the input surface;
a processor; and
a memory storing instructions that, when executed by the processor, cause the processor to:
receive information about the pen positions detected by the pen position detector and information about the touch positions detected by the touch position detector, and
perform a plurality of processes based on the information about the pen positions and the information about the touch positions,
wherein:
the plurality of processes includes a predetermined process associated with a special positional relation,
the predetermined process switches an operation mode of the input apparatus,
when information about one of the pen positions and information about one of the touch positions are received by the processor within a predetermined period of time, the processor determines whether the one of the touch positions corresponds to a palm or a finger of the hand of the user holding the electronic pen while the pen position is input on the input surface with the electronic pen and detected by the touch position detector,
when the one of the touch positions is determined to correspond to the palm of the hand of the user holding the electronic pen, the one of the touch positions is invalidated;
when the one of the touch positions is determined to correspond to the finger of the hand of the user holding the electronic pen, the processor determines whether a positional relation between the one of the pen positions and the one of the touch positions is the special positional relation,
when the one of the touch positions is determined to correspond to the finger of the hand of the user holding the electronic pen and the processor determines that the positional relation between the one of the pen positions and the one of the touch positions is the special positional relation, the processor performs the predetermined process associated with the special positional relation, and
when the one of the touch positions is determined to correspond to the finger of the hand of the user holding the electronic pen and the processor does not determine that the positional relation between the one of the pen positions and the one of the touch positions is the special positional relation, the processor performs a process different from the predetermined process.

2. The input apparatus according to claim 1, wherein:
the positional relation between the one of the pen positions and the one of the touch positions is determined to be the special positional relation depending on whether a distance between the one of the pen positions and the one of the touch positions is equal to or less than a predetermined distance.

3. The input apparatus according to claim 1, wherein:
the special positional relation includes a direction of the one of the touch positions relative to the one of the pen positions.

4. The input apparatus according to claim 1, wherein:
the instructions, when executed by the processor, cause the processor to accept registration of information about the special positional relation based on input by the user holding the electronic pen, and store the information about the special positional relation.

5. The input apparatus according to claim 4, wherein:
the special positional relation does not occur at a time of a writing input operation.

6. The input apparatus according to claim 1, wherein:
when a distance between the one of the pen positions and the one of the touch positions is smaller than a predetermined distance the processor does not invalidate the information about the one of the touch positions detected by the touch position detector.

7. The input apparatus according to claim 1, wherein:
the instructions, when executed by the processor, cause the processor to accept registration of the predetermined process corresponding to the special positional relation and store the predetermined process.

8. The input apparatus according to claim 7, wherein:
the instructions, when executed by the processor, cause the processor to enable the user to select the predetermined process from a plurality of processes.

9. The input apparatus according to claim 1, wherein:
the touch position detector includes a first sensor of a capacitive coupling type and a first position detection circuit, the pen position detector includes a second sensor of an electromagnetic induction type and a second position detection circuit, and
the first sensor and the second sensor are superimposed on each other in a direction perpendicular to the input surface.

10. The input apparatus according to claim 1, wherein:
the touch position detector includes a first sensor of a capacitive coupling type and a first position detection circuit which, in operation, detects the touch positions,
the pen position detector includes the first sensor and a second position detection circuit which, in operation, receives a signal from an electronic pen of the capacitive coupling type through the first sensor and detects the pen positions indicated by the electronic pen of the capacitive coupling type, and
the first position detection circuit and the second position detection circuit operate in a time-division manner.

11. The input apparatus according to claim 1, wherein:
the predetermined process performed when the positional relation between the one of the pen positions and the one of the touch positions is determined to be the special positional relation switches between a writing mode in which input of one or more of the pen positions from the electronic pen is detected as a writing input and an eraser mode in which input of one or more of the pen positions from the electronic pen is detected as a deletion input.

12. The input apparatus according to claim 1, wherein:

the predetermined process performed when the positional relation between the one of the pen positions and the one of the touch positions is determined to be the special positional relation starts a predetermined application.

13. The input apparatus according to claim 1, wherein:

the input surface is provided on a surface of a display screen that displays a trajectory of a plurality of pen positions on the display screen, and the predetermined process performed when the positional relation between the one of the pen positions and the one of the touch positions is determined to be the special positional relation changes display attributes of the trajectory of the pen positions.

* * * * *